No. 883,369. PATENTED MAR. 31, 1908.
J. A. WIGGS, Jr.
BEARING FOR DRIVING AND OTHER SHAFTS.
APPLICATION FILED DEC. 13, 1906.

2 SHEETS—SHEET 1.

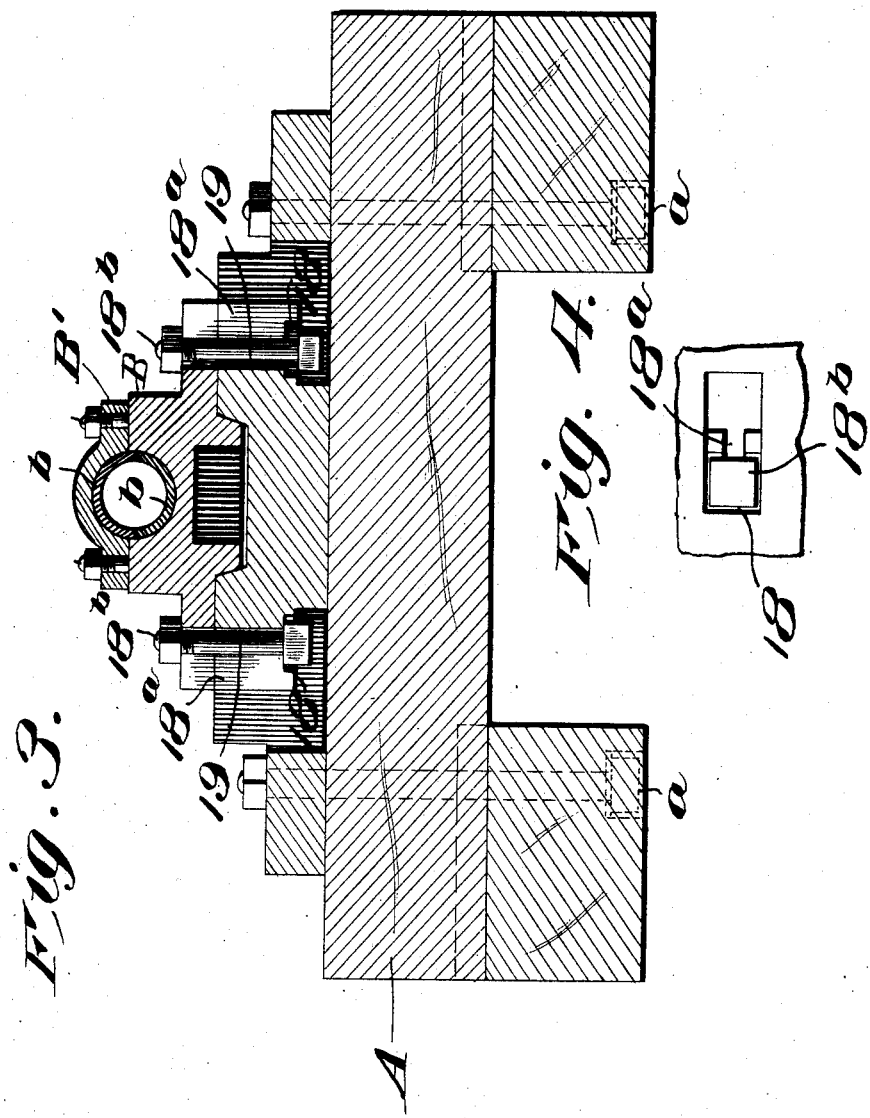

UNITED STATES PATENT OFFICE.

JAMES A. WIGGS, JR., OF BEAUMONT, TEXAS.

BEARING FOR DRIVING AND OTHER SHAFTS.

No. 883,369.    Specification of Letters Patent.    Patented March 31, 1908.

Original application filed July 24, 1906, Serial No. 327,483. Divided and this application filed December 13, 1906.
Serial No. 347,610.

*To all whom it may concern:*

Be it known that I, JAMES A. WIGGS, Jr., citizen of the United States, residing at Beaumont, in the county of Jefferson and State of Texas, have invented certain new and useful Improvements in Bearings for Driving and other Shafts; and I do hereby declare the following to be a full, clear, and exact description of the invention, such as will enable others skilled in the art to which it appertains to make and use the same.

The chief object of this invention is to facilitate the removal of driving shafts without disturbing any other mechanism.

To this end the said invention consists in the construction and combination of parts hereinafter more particularly set forth and claimed.

Figure 1:
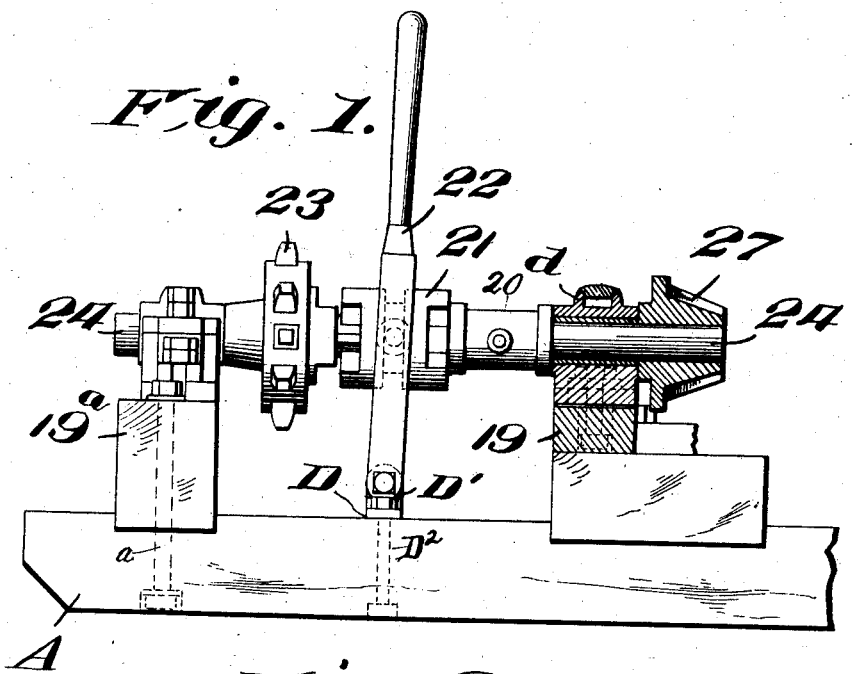
Figure 2:
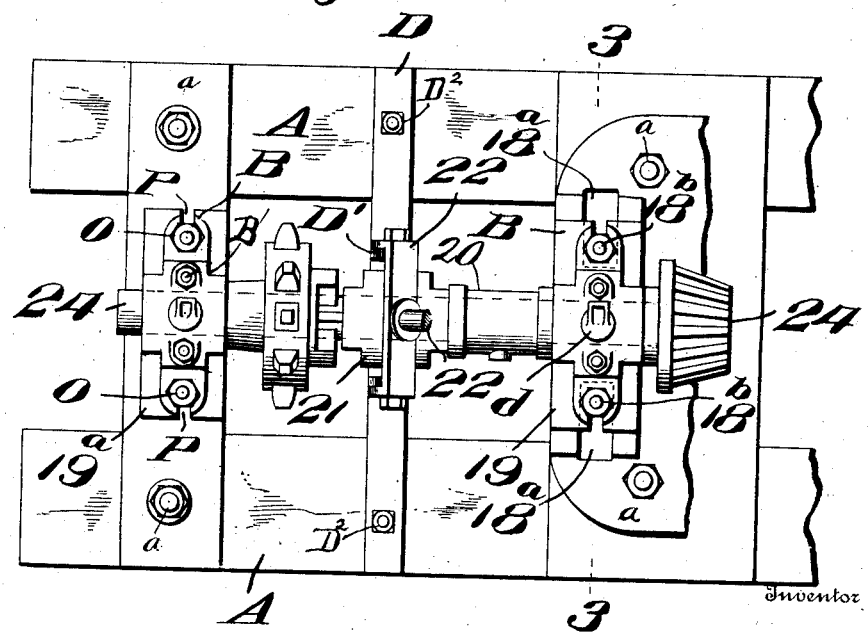

In the accompanying drawings Figure 1 represents a side elevation of a shaft, with its bearings and proximate devices, partly in vertical section, embodying my invention; Fig. 2 represents a plan view of the same; Fig. 3 represents a transverse section through Fig. 2, on line 3—3 of the latter, omitting the oil cup; and Fig. 4 represents a detail bottom view of a part of one of the bearings and the bolt having its head in the pocket thereof.

A designates a bed frame supporting bearings as hereinafter described, for a driving shaft 24, the latter being provided with a sprocket wheel 23, whereby it receives rotary movement from any source of power: also with a gear wheel 27, whereby it may drive any suitable mechanism, for example the annular table of a rotary well-boring machine. This wheel 27 is fast on said shaft, but the said sprocket wheel may be normally loose thereon and clutched at will by a collar 21 which is feathered on said shaft and operated by a shifting lever 22, pivoted at its lower end to a lug or lugs $D^1$ raised on a metallic plate D, which is fastened by bolts $D^2$ to said bed frame. A spacing sleeve 20 surrounds shaft 24 between said clutch and the inner bearing for said shaft.

Each of the two bearings consists as usual of a removable upper cap $B^1$ and a lower section B. Said lower sections B are fastened on blocks or plates 19 respectively, fastened to the said bed frame by bolts $a$. Each cap may have an oil cup $d$ (Figs. 1 and 2) and is fastened in any convenient way to the section B below it. Bolts $18^b$ pass through slots or holes in the sides of each section B fastening it to block or plate 19.

The attachment of each bearing section B is made as follows; The bolt head is presented downward in the lower part of a slot $18^a$ that extends to the side or edge of said plate 19. The lower part of this slot is broad enough to let the said bolt head pass out laterally, but the upper part of said slot is too narrow to permit this, although it will permit at all points such lateral pasage of the stem of the bolt. A pocket 18 is formed in the material of said block or plate 19 extending upward from the broader part of said slot but not extending laterally to the side or edge of said block or plate. Consequently, when the said bolt head is drawn up into said pocket it is locked against said lateral motion. As the bolt head and pocket are of prismatic form and proper relative size the bolt is also locked against turning.

When the shaft is to be moved, taking the pinion 27 out of gear, the two bolts $18^b$ are lowered sufficiently to bring their heads opposite the broader lower parts of the slots $18^a$ when the said shaft may be tilted bringing the bolt heads out and up through said enlarged parts of the slots and removing the bearings and shaft together from the bed frame, without separating the cap $B^1$ and lower section B of such bearing from each other.

The operation above described avoids all risk of losing or injuring the cap plates of the bearings or other small parts, for the parts B $B^1$ are not separated and the bearings remain on the shaft.

Having thus described my invention, what I claim as new and desire to secure by Letters Patent is:—

1. In combination with a shaft, a removable bearing therefor, a block or plate supporting such bearing and bolts connecting the said bearing and plate together, said plate being provided with lateral slots for said bolts, each slot consisting of a broader lower part and a narrower upper part and a pocket, into which the head of the bolt may be drawn to prevent lateral motion and out of which the said bolt may be lowered to permit the same, substantially as set forth.

2. In combination with a shaft a removable bearing therefor, a block or plate supporting such bearing and prismatic headed bolts connecting the said bearing and plate together, said plate being provided with lateral slots for said bolt, each slot consisting of a broader lower part and a narrower upper part and having a prismatic pocket into which the head of one of the bolts may be drawn to lock said bearing to said plate and said bolt against turning, the said slots permitting the lateral escape of the bolt heads when lowered from said pockets and the consequent release of the shaft and bearings substantially as set forth.

In testimony whereof, I have signed my name to this specification in the presence of two subscribing witnesses.

JAMES A. WIGGS, Jr.

Witnesses:
CHAS. H. SMITH,
D. M. HOLLINGSWORTH.